United States Patent [19]

Stevens

[11] Patent Number: 4,661,006

[45] Date of Patent: Apr. 28, 1987

[54] FILE

[76] Inventor: Arthur W. Stevens, 30 Danehurst, Rowena Road, Westgate-on-Sea, Kent, CT8 8QQ, England

[21] Appl. No.: 818,953

[22] Filed: Jan. 15, 1986

[30] Foreign Application Priority Data

Jan. 16, 1985 [GB] United Kingdom ................. 8501119
Aug. 8, 1985 [GB] United Kingdom ................. 8519695

[51] Int. Cl.[4] .......................... B42F 13/00; B42F 3/02; F16B 13/00; F16B 27/00

[52] U.S. Cl. ........................................ 402/18; 402/17; 402/22; 411/84; 411/85

[58] Field of Search ........................ 402/17, 18, 19, 20, 402/21, 22, 46; 411/84, 85; 248/225.1

[56] References Cited

U.S. PATENT DOCUMENTS

| | | | |
|---|---|---|---|
| 1,638,763 | 8/1927 | Ennis | 402/17 |
| 3,456,706 | 7/1969 | Ollis, Jr. | 411/84 |
| 3,574,472 | 4/1971 | Cott | 402/22 |
| 4,375,880 | 3/1983 | Sinclair | 248/225.1 |
| 4,488,844 | 12/1984 | Baubles | 411/85 |

FOREIGN PATENT DOCUMENTS

| | | | |
|---|---|---|---|
| 238684 | 7/1964 | Austria | 402/18 |
| 1052270 | 12/1966 | United Kingdom | 402/17 |

*Primary Examiner*—Paul A. Bell
*Assistant Examiner*—Paul M Heyrana, Sr.
*Attorney, Agent, or Firm*—Hopgood, Calimafde, Kalil, Blaustein & Judlowe

[57] ABSTRACT

A file cover has paper-penetrating prongs which are secured in the assembly by engagement with a mounting channel and at least one of which is slidable along the channel whereby the spacing between them is infinitesimally adjustable. A retainer for each prong is preferably an apertured block borne by a parallel channel member, at least one of the blocks being slidably movable in the parallel channel member.

9 Claims, 9 Drawing Figures

FILE

This invention relates to files (for paperkeeping).

BACKGROUND OF THE INVENTION

Files of various sorts are well known wherein papers, sheets, envelopes and the like (hereinafter "papers) to be stored are releasably held by strings, clips, rings, clamped strips or the like which penetrate them. But all these demand that the holes in the papers through which these shall pass, and their place of attachment to the files generally correspond. For this to happen the distancing must be standardized. Where adjustability is given it is a limited one and may involve separate, separately insertable, retainers.

But for some types of papers the holes are at non-standard distances as between paper of one origin and that of another. A particular example is computer print-out paper, different makes or uses of which have various different spacings between their edges.

SUMMARY OF THE INVENTION

We provide in this invention filing means in which the spacing-apart of a plurality of holders, which are to pass through filed papers, is variable at will and normally by infinitesimal increments over a wide range.

This variability allows the file to be used not only for standardised punched paper but for non-standard materials such as print-out paper; and to be used for longitudinal instead of lateral retention of print-out or other papers which have a longitudinal row of perforations along each edge. Furthermore, unlike some prior art systems, the holders are part of the assembly as sent-out and are retained in it.

This variability is achieved by forming the holders as an elongate flexible prong and retaining a head end of each prong mounted on at least one support surface of the filing means. At least one of the prongs can slide along the strip. The heads may be set at any desired distance apart according to the standard or non-standard spacing of the apertures in the papers to be retained. If the head is round, the holder may be rotatable in the channel.

In a preferred form the retainer through which the prong passes is a hole through a block mounted on the inner side of a second cover of the file; papers are fitted onto the retainer by withdrawing its free end from the hole entirely so that it may be passed through holes in the papers and then through the orifice. In this case it is possible to vary the separation of a plurality of retainers in the file, and so it should also be possible to vary correspondingly the position and separation of the blocks through which the retainers pass. This may be achieved conveniently by having a second channel member on the other cover of the file, in which the blocks are slidably retained.

An alternative holding means for holding the retainers onto the papers is a further channel-section strip with a plurality of apertures in its base and a clamping slider movable along the channel to entrap and clamp the end of a retainer projecting into it through one of the apertures. One way to do this is to have an orifice through the clamping stud parallel to the direction of elongation of the channel, through which orifice the retainer is led. If the slider is brought near to the aperture through which that retainer entered that channel, the retainer is bent and thereby clamped. The slider may be split so that its channel-engaging part bends to spring apart thereby resiliently pressing on the channel and offering some frictional resistance to displacement.

The channel member with the prongs may be mounted on any desired filing system part, e.g. on a cardboard file cover, on a suspension file or on a rigid filing drawer or board.

BRIEF DESCRIPTION OF THE DRAWINGS

A particular embodiment of the invention will now be described with reference to the accompanying drawings wherein.

DESCRIPTION OF SPECIFIC EMBODIMENTS

Figure 1:
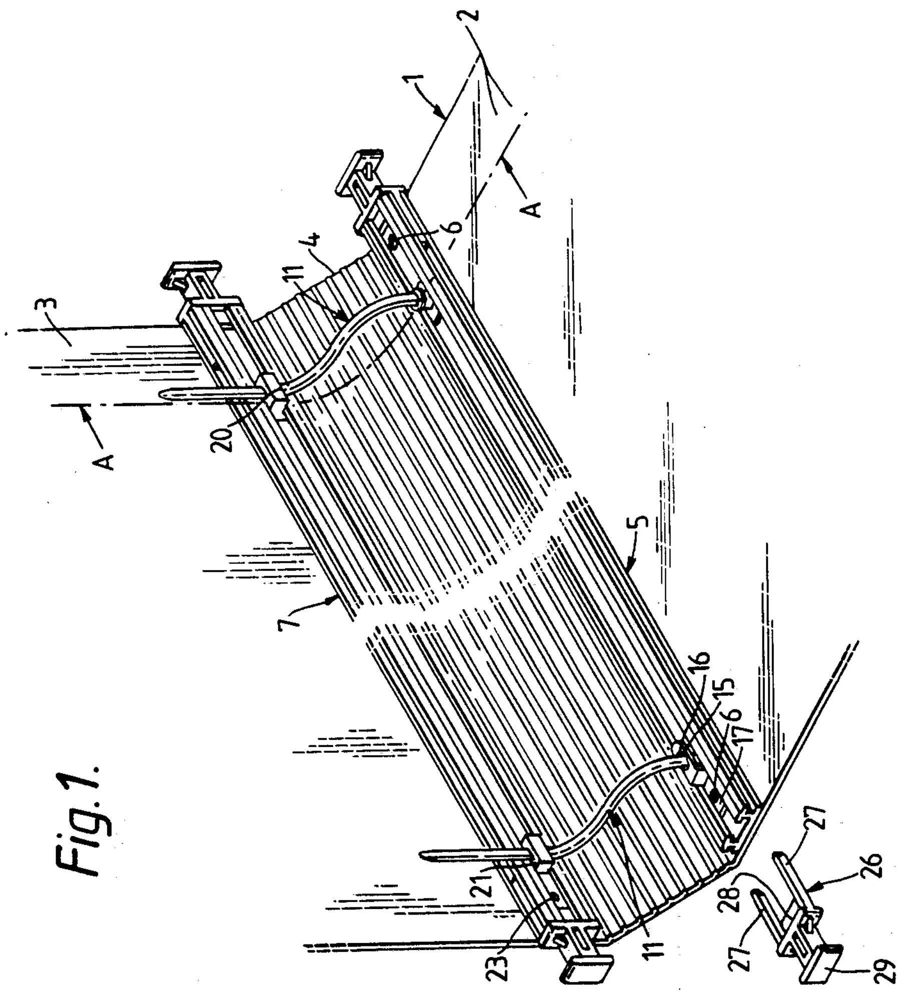
FIG. 1 is a perspective view of the spine portion of a file cover embodying the invention.

In these embodiments, paper-retaining prongs are retained on a backing surface with at least one of them being moveable on that surface by virtue of sliding interaction with a channel on that surface which directly or indirectly traps the head of the prong. In this way, the invention allows either the easy retention of documents in which the apertures are non standard distance apart or easy adaptation for retention of documents of which the apertures are any one of a plurality of standard distances apart.

In the first embodiment to be described, which is the presently preferred embodiment, a file cover 1 has a first rigid cover 2 and a second rigid cover 3 joined by a conventional flexible spine 4.

Papers to be held within the folder are to be built up against the cover 2 which therefore acts as a supporting surface.

To retain the papers (within the term "papers" we include of course all similar essentially flat materials which may be needed to be retained in a file cover such as films, microfiche envelopes etc) there is secured a channel member 5. This may be secured by any means but particularly suitable (for reasons which will be explained) will be securing by rivets such as 6.

Similarly mounted on the other cover 3 is a similar channel member 7.

The cross-section of the channel members 5,7 can be more easily seen from FIGS. 2 to 5.

Each member has upstanding channel walls 8 topped by inturned ledges 9 to define a restricted mouth of the channel. There are also outwardly projecting ledges 10 to define grooves between themselves and extensions of the base of the members, the bottom of the grooves being the mutually outer surfaces of the walls 8. The ledges 10 are of tapered cross-section in order to decrease the sharpness with which any papers retained on the channel will be bent over those ledges.

Within the channel 5 are fitted the head ends of two elongate prongs 11. Each of these has a long substantially flexible tongue 12 terminating at its head end in a boss 13 and stud 14, the stud 14 being for slidably fitting within the channel formed by the side walls 8 of the channel member 5 and being entrapped by the overhanging ledges 9. The prongs 11 act as elongate holder means.

The prong is formed in a one piece integral whole of a material of a suitable degree of tough flexibility such as for example polypropylene or nylon.

One of the two prongs 11 is free to slide along substantially the whole of the length of the channel 5 but the other has its head entrapped and retained by a stepped bracket 15 one arm of which has an aperture 16 through which the tongue part 12 can project and which encloses the boss part 13. The stud part 14 of that prong is entrapped in the channel. A second arm 17 of the bracket 15 is held stationary in the channel preferably by being penetrated by one of the rivets 6 which hold the channel member to the backing surface 2.

Figure 5:
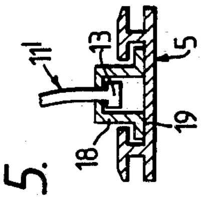
FIG. 5 is an end view of a modification.
Figure 8:
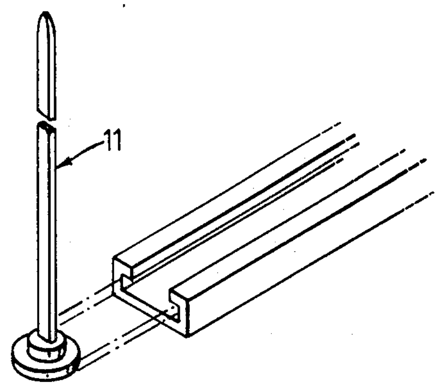
FIG. 8 is a detail of another part of the second embodiment.
Figure 7:
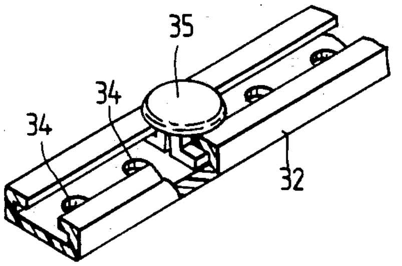
FIG. 7 is a detail of one part of the second embodiment.
Figure 6:
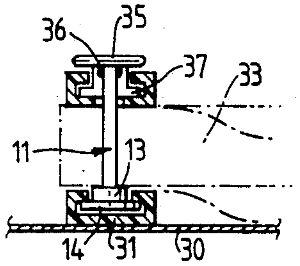
FIG. 6 is an end view of a second embodiment.

An alternative manner of retaining the prongs in the channel member 5 is illustrated in FIG. 5 where a prong 11' has an enlarged boss part 13 but does not itself engage directly with the channel. Rather, a hat-sectioned slider 18 may entrap the boss and be entrapped by means of its divergent flanges 19 under the overhanging ledges 9. Such a slider 18 may be continued into a tab analogous to the arm 17 of the bracket 15 so that it may be retained immobile if so wished.

Figure 2:
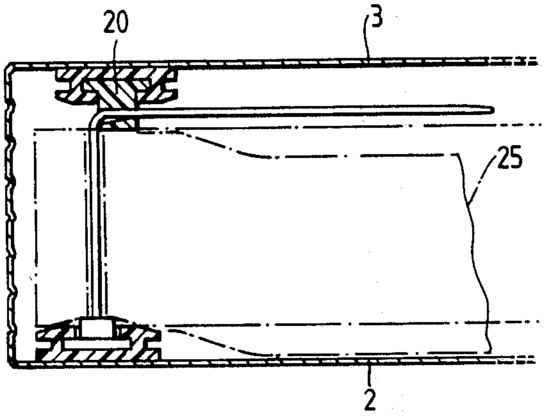
FIG. 2 is a sectional view on the line A—A, FIG. 1, of the file cover in closed condition and containing papers.
Figure 3:
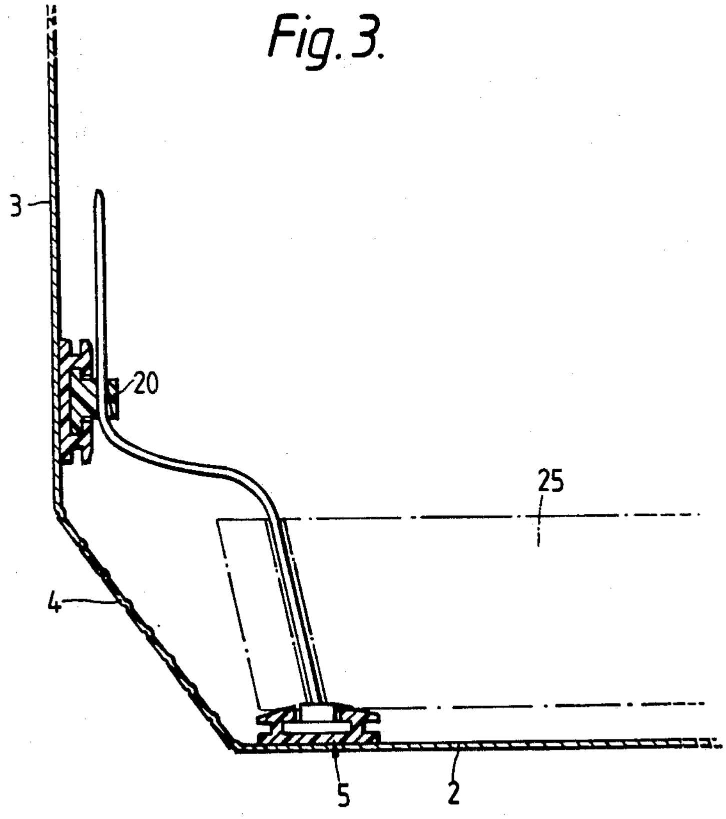
FIG. 3 is the same sectional view but in half-open condition.
Figure 4:
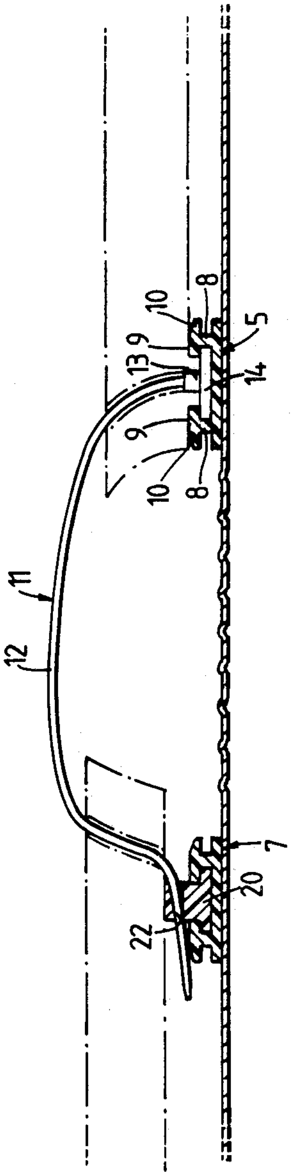
FIG. 4 is the same sectional view but in fully opened condition.

The purpose of the prongs 11,11' is to penetrate through a stack of paper or the like as is shown in FIGS. 2, 3 and 4. They have to be retained in some way at the far side of the stack of papers and a particularly advantageous method of retention is shown in FIGS. 1 to 4.

In the channel members 7 mounted on the other cover 3 of the file cover there are provided retainers 20,21. These are entrapped by the overhanging ledges 9 of the channel 7 and have in the part which projects above that channel an aperture which is divergent in the direction towards the other channel. This is to assist the introduction into and through that aperture of the free end of the flexible tongue part 12 of a prong 11,11'.

Block 21 receives the free end of the tongue part 12 in exactly the same way but this block is extended by an arm 23 (FIG. 1) which is secured e.g. by riveting to the cover 3 to prêvent movement of that block. To summarize, prongs 11 (or 11') are retained at their free ends by the blocks 20,21 one of the prongs being restrained against any movement longitudinally of the channels, but the other being freely slidable at both of its ends (stud 14 and retainer 20) to any desired position along the channel members.

The closed position of the file cover is seen in FIG. 2. A stack of papers 25 has been formed on the prongs 11. In a closed condition, the prong is bent by interaction with the retaining means 20 and lies under the cover 3 between it and the stack 25. It does not need any additional locking and as the file cover is opened (FIGS. 3 and 4), the prong is free to slide as necessary through the aperture 22 in the block and the retention means 20 until the fully opened condition as seen in FIG. 4 is reached, when if necessary the stack 25 may be parted to give access to a desired portion of the paper or without parting the stack the end of the prong may be freed from the retainer 20 to allow further papers to be put on or to allow papers to be taken off. The action in respect of the retainer 21 is identical.

The spacing across the folder of the two prongs is variable by infinitemisal amounts but one of the prongs being achored, the block of papers as a whole is held in a fixed position in the file cover.

At each end of each of the channels there may be attached suspension hooks 26 having parallel fork arms 27 which are to engage snugly in the grooves on the channel members 5,7. There is also a tongue 28 which fits into the end of the channel defined by the walls 8 and under the inturned flanges 9. The head 29 of the hook 26 is designed both to allow ease of handling and to act, once the hook is attached, as a suspension means for the file folder and the papers that it contains.

In a modified embodiment seen in FIGS. 6 to 9, a support surface 30 is a rigid member for example of a file cover and has a channel 31 and stud 14 of prongs 11 as before. One or both of the prongs is or are axially slideable along the channel 31.

Figure 9:
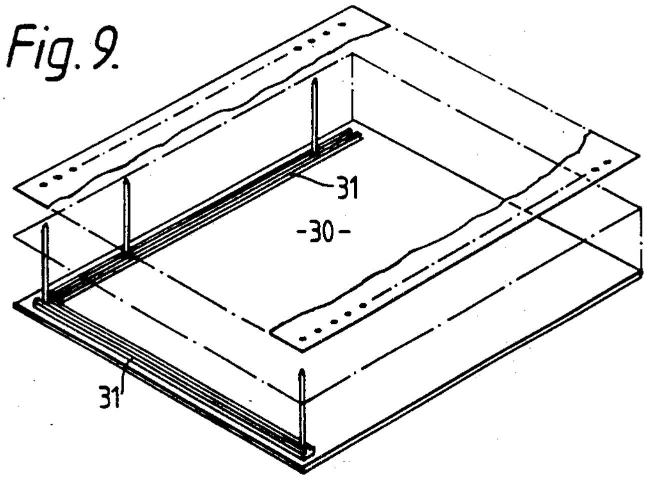
FIG. 9 is a perspective view showing a possible arrangement of the second embodiment.

As can be seen from FIG. 9, channels 31 may be provided on one or more sides of the surface 30 so that papers may be mounted in either direction upon that surface.

Retaining means in this embodiment consist of a strip 32 placed on the upper surface of a stack of papers 33 formed by penetration by the prongs 11. The strip 32 has frequent apertures 34 in its base through any of which the free end portion of the tongue of the prong 11 may be brought up. There is a slider 35 in the channel 32 which has an aperture 36 through it extending in the direction of the channel. The free end of the flexible part 12 of the prong is brought through that aperture and the retention is tightened by bringing the slider back towards the aperture 34 through which the tongue penetrated. The slider 35 is split and its channel-engaging legs 37 tend to be urged apart to press frictionally against the channel so that it does not slide too freely.

The apertures 34 may be at very close centres and/or may be elongated along the channel so that the adjustability of this embodiment is in effect infinitesimal.

FIG. 9 illustrates also how this embodiment (and the previous one) may be in the form of a flat filing carrier for paper such as a filing drawer or a display panel.

I claim:

1. Filing apparatus comprising a support surface, elongate flexible prongs attached at a first end to the support surface for releasably retaining paper or the like by passage of a second end of the prongs through holes in the paper, means for securing a second portion of the prongs on the side of the retained paper opposite to the first ends, a channel member on the support surface and means retaining the first end of at least one prong in the channel member for slidable movement of the prong along the channel, a second surface and blocks carried by said second surface, at least one of said blocks being mounted for slidable movement one said second surface corresponding to the slidable movement of said at least one prong on said support surface, said blocks being adapted to secure said second portions of said prongs with slidable movement of said portions relative to said blocks.

2. Filing apparatus according to claim 1 wherein there are at least two prongs, the first end of each such prong being held in said channel member.

3. Filing apparatus according to claim 1 wherein the means by which the first end of a prong is held in a channel is a stud at said first end vertically entrapped in the channel by overhanging ledges thereof.

4. Filing apparatus according to claim 1 wherein a second channel member on the second surface retains said blocks for allowing said at least one of said blocks to be slidably moved on the second surface.

5. Filing apparatus according to claim 4 wherein the second surface is joined hingewise to said support surface.

6. Filing apparatus according to claim 1 wherein there are provided means for securing another of said prongs at a selected position along the channel member.

7. Filing apparatus according to claim 4 wherein there are provided means for securing another of said blocks at a selected position along said second channel member.

8. Means for filing, comprising: a support surface, a channel member on said support surface, a restricted mouth of said channel member, a plurality of elongate flexible holder means each of which has a head end, means for mounting the head ends of said holder means to said channel member, to be retained by said restricted mouth, said mounting means being for permitting slidable movement of at least one of said plurality of prongs along said channel member, and retainer means for retaining a portion of said holder means remote from said head end thereof; said retainer means comprising: a second channel member parallel to the first-mentioned channel member and mounted on a second surface hingedly linked to said support surface, a plurality of apertured retention means respectively adapted for sliding reception of and engagement to said portion of said holder means, means for mounting said retention means in said second channel member and being for permitting slidable movement of at least one of said retention means along said second channel member.

9. Means as claimed in claim 8 wherein each of said holder means is a one-piece prong member with a toughly flexible tongue and an enlarged head end engaged directly by said restricted mouth.

* * * * *